US009228506B2

(12) United States Patent
Gokhale et al.

(10) Patent No.: US 9,228,506 B2
(45) Date of Patent: *Jan. 5, 2016

(54) MULTI-FUEL CONTROL SYSTEM AND METHOD

(71) Applicant: General Electric Company, Schenectady, NY (US)

(72) Inventors: Manoj Prakash Gokhale, Bangalore (IN); Adam E. Klingbeil, Ballston Lake, NY (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/538,927

(22) Filed: Nov. 12, 2014

(65) Prior Publication Data

US 2015/0068506 A1 Mar. 12, 2015

Related U.S. Application Data

(63) Continuation-in-part of application No. 13/204,985, filed on Aug. 8, 2011, now Pat. No. 8,977,469, which is a continuation-in-part of application No. 12/128,034, filed on May 28, 2008, now Pat. No. 7,996,147.

(51) Int. Cl.
*F02D 41/02* (2006.01)
*G06F 17/00* (2006.01)
(Continued)

(52) U.S. Cl.
CPC ............ *F02D 19/0628* (2013.01); *F02B 37/18* (2013.01); *F02B 39/16* (2013.01);
(Continued)

(58) Field of Classification Search
CPC ............... F02B 1/00; F02B 3/06; F02B 9/00; F02B 29/083; F02B 29/0443; F02B 29/0475; F02B 33/446; F02B 2075/125; F02D 1/183; F02D 11/10; F02D 11/105; F02D 11/107; F02D 19/10; F02D 41/0025; F02D 41/0072; F02D 41/222; F02D 41/2422; F02D 41/2467; F02D 41/401; F02D 2041/001; F02M 13/08; F02M 21/02; F02M 1/00; F02M 15/06; F02M 25/0707; F02M 25/0756; F02M 31/18; F02M 31/20; F02M 37/0029; F02M 41/126; F02M 59/30; F02M 59/366; F02M 69/54; G01M 15/11; B60W 10/06
USPC ........... 123/1 A, 27 R, 27 GE, 295, 304, 361, 123/369, 399, 403, 457–460, 500–506, 123/511–513, 525–527, 540–542, 555–557, 123/563, 564, 575, 568.12, 568.21; 701/102, 104, 105, 108, 110, 114, 115
See application file for complete search history.

(56) References Cited

U.S. PATENT DOCUMENTS 3,750,635 A 8/1973 Hoffman et al.
4,594,201 A 6/1986 Phillips et al.
(Continued)

FOREIGN PATENT DOCUMENTS

JP 2007040165 A 2/2007
WO 2006025958 A1 3/2006

*Primary Examiner* — John Kwon
*Assistant Examiner* — Johnny H Hoang
(74) *Attorney, Agent, or Firm* — GE Global Patent Operation; John A. Kramer

(57) ABSTRACT

A system includes a controller operable to communicate with at least one sensor and an engine. The controller responds to one or more signals received from the sensor and influences engine operation based on determined engine operation threshold limits and information regarding a first fuel and a second, different fuel. The controller is configured to change or maintain engine operation based on the one or more signals compared to the threshold limits, and to change or maintain an engine fuel supply to control specific fuel consumption of at least one of the first and second fuels and to achieve values for the one or more signals in a determined range relative to the threshold limits. The one or more signals indicate an exhaust emissions parameter or at least one of pre-turbine temperature, fuel injection pressure, turbocharger rotational speed, peak firing pressure, rate of pressure rise, or knock intensity.

23 Claims, 6 Drawing Sheets

(51) Int. Cl.
  *F02D 19/06*  (2006.01)
  *F02D 41/40*  (2006.01)
  *F02D 35/02*  (2006.01)
  *F02D 41/00*  (2006.01)
  *F02D 19/08*  (2006.01)
  *F02B 37/18*  (2006.01)
  *F02B 39/16*  (2006.01)
  *F02B 29/04*  (2006.01)
  *F02M 25/07*  (2006.01)
  *F01N 5/02*  (2006.01)

(52) U.S. Cl.
  CPC ......... *F02D 19/061* (2013.01); *F02D 19/0605* (2013.01); *F02D 19/0647* (2013.01); *F02D 19/081* (2013.01); *F02D 35/02* (2013.01); *F02D 35/023* (2013.01); *F02D 35/028* (2013.01); *F02D 41/0007* (2013.01); *F02D 41/0025* (2013.01); *F02D 41/401* (2013.01); *F01N 5/02* (2013.01); *F02B 29/0406* (2013.01); *F02B 2039/164* (2013.01); *F02B 2039/168* (2013.01); *F02D 19/0642* (2013.01); *F02D 19/0655* (2013.01); *F02D 35/025* (2013.01); *F02D 2200/0414* (2013.01); *F02D 2200/0602* (2013.01); *F02D 2200/0606* (2013.01); *F02D 2200/0611* (2013.01); *F02D 2200/0625* (2013.01); *F02M 25/071* (2013.01); *Y02T 10/144* (2013.01); *Y02T 10/36* (2013.01); *Y02T 10/44* (2013.01)

(56) References Cited

U.S. PATENT DOCUMENTS

| | | | |
|---|---|---|---|
| 4,682,293 | A | 7/1987 | Goldenberg et al. |
| 5,137,230 | A | 8/1992 | Coffinberry |
| 5,271,370 | A | 12/1993 | Shimada et al. |
| 5,546,908 | A | 8/1996 | Stokes |
| 6,460,513 | B1 | 10/2002 | Meyer et al. |
| 6,848,416 | B1 | 2/2005 | Pien |
| 7,089,908 | B2 * | 8/2006 | Fujieda et al. ............ 123/299 |
| 7,549,408 | B2 | 6/2009 | Russell |
| 7,627,416 | B2 | 12/2009 | Batenburg et al. |
| 7,720,593 | B2 * | 5/2010 | Yi et al. ............ 701/105 |
| 8,196,567 | B2 * | 6/2012 | Pursifull et al. ............ 123/495 |
| 2007/0157912 | A1 | 7/2007 | Ritter et al. |
| 2007/0199539 | A1 | 8/2007 | Lennox et al. |
| 2007/0215110 | A1 | 9/2007 | Stein et al. |
| 2008/0006252 | A1 | 1/2008 | Kramer |
| 2008/0262701 | A1 | 10/2008 | Williams et al. |
| 2009/0288638 | A1 * | 11/2009 | Dintino et al. ............ 123/447 |

* cited by examiner

MULTI-FUEL CONTROL SYSTEM AND METHOD

CROSS-REFERENCE TO RELATED APPLICATIONS

This application is a continuation-in-part of U.S. patent application Ser. No. 13/204,985, filed Aug. 8, 2011, which is a continuation-in-part of U.S. patent application Ser. No. 12/128,034, filed May 28, 2008, now U.S. Pat. No. 7,996,147, which are both hereby incorporated by reference in their entirety for all purposes.

BACKGROUND

1. Technical Field

Embodiments of the invention relate to a system and method for controlling the use of multiple fuels.

2. Discussion of Art

Internal combustion engines may be classified as compression-ignition or spark-ignition engines. A diesel engine is a compression-ignition engine, and a gasoline engine is a spark-ignition engine.

Engines may be classified as either two-stroke or four-stroke. A four stroke engine includes an intake stroke, a compression stroke, a power stroke, and an exhaust stroke. During the intake stroke, the engine introduces fuel and air into a cylinder as its respective piston moves away from top dead center (TDC) in the cylinder. During the compression stroke, the piston moves toward TDC in the cylinder, thereby compressing the fuel/air mixture until ignition. The ignition occurs due to the heat of compression and/or a glow plug in a compression-ignition engine. The ignition occurs due to a spark (e.g., a spark plug) in a spark-ignition engine.

For either engine type, the combustion of the fuel/air mixture causes significant heat and pressure in the cylinder during the power stroke, thereby driving the piston away from TDC and creating mechanical output power through the crankshaft, transmission, and so forth. During the exhaust stroke, the piston moves back toward TDC, thereby forcing the exhaust out of the cylinder. A two stroke engine operates by combining the power stroke with the exhaust stroke, and by combining the intake stroke with the compression stroke.

In each of these engines, a variety of parameters affect the engine performance, fuel efficiency, exhaust constituents, and so forth. Exhaust constituents include carbon oxides (e.g., carbon monoxide), nitrogen oxides (NOx), sulfur oxides (SOx), unburnt hydrocarbons (HC), and particulate matter (PM). Each engine has threshold values, such as speed, flow rate, temperature, and pressure associated with the various components. For example, the threshold values may include in-cylinder peak firing pressure (PFP), pre-turbine temperature (PTT) of a turbocharger, and turbocharger speed (TRBSPD) of the turbocharger. A specific threshold value of a turbocharger is a choke line, which often represents a threshold limit in the air flow rate or pressure ratio between a compressor inlet and exit due to design constraints in the size of inlets, outlets, passages, and so forth. These engine parameters (e.g., PFP, PTT, and TRBSPD) should be maintained within a threshold value range to avoid failure of the engine power assembly and turbocharger. Also, the compressor choke condition should be avoided to reduce the possibility of turbocharger failure.

It may be desirable to have an engine and/or a controller that differs from those that are currently available. It may be desirable to have a method of operation that differs from those methods of use that are currently available.

BRIEF DESCRIPTION

In one embodiment, a system includes a controller operable to communicate with at least one sensor and with an engine, and thereby to control operation of the engine. The controller is responsive to one or more signals received from the at least one sensor and influences the engine operation based on determined engine operation threshold limits and information regarding a first fuel and a second fuel, wherein the first fuel and second fuel are not the same type of fuel. The controller is configured to change or maintain the engine operation based on the one or more signals received from the at least one sensor compared to the determined engine operation threshold limits, and the controller is configured to change or maintain an engine fuel supply to control specific fuel consumption of at least one of the first fuel and second fuel and to achieve values for the one or more signals in a determined range relative to the engine operation threshold limits. The one or more signals indicate an exhaust emissions parameter or at least one of pre-turbine temperature, fuel injection pressure, turbocharger rotational speed, peak firing pressure, rate of pressure rise, or knock intensity.

BRIEF DESCRIPTION OF THE DRAWINGS

These and other features and aspects of the invention are understood when the following detailed description is read with reference to the accompanying drawings in which like characters represent like parts throughout the drawings, wherein.

DETAILED DESCRIPTION

Embodiments of the invention relate to a system and method for controlling the use of multiple fuels. The system may be used to propel a vehicle. Suitable vehicles can include a locomotive, an automobile, a bus, mining or industrial equipment, or a marine vessel. Alternatively, the system may include a stationary system, such as a power generation system having the engine coupled to a generator. The illustrated engine is a compression-ignition engine, such as a diesel engine. However, other embodiments relate to a spark-ignition engine, such as a gasoline-powered internal combustion engine.

The multi-fuel system includes at least a first fuel and a second that is different from the first fuel. While fuel blends are contemplated, e.g., diesel and diesel+additive, as used herein and unless indicated otherwise by context or language, the term "different fuel" means two fuels that are of different fuel base types. Suitable different fuels may be selected from diesel, bio-diesel, natural gas, alcohol, vegetable oil, animal-based oil, synth gas, kerosene, hydrogen, and the like. Suitable alcohols may include methanol, ethanol, propanol, butanol, and other short chain alcohols. A suitable vegetable oil may include rapeseed oil, algal oil, colza oil, soya oil, sun flower oil, hemp oil, and nut oils. As used herein, "fuel ratio" means the amount of a first fuel relative to the amount of a second, different fuel as the fuels are supplied to an engine.

In one embodiment, the multi-fuel control system maintains engine operation parameters within acceptable wear and tear limits and with some control over other operational parameters, such as engine emissions, performance/power output, or the specific fuel consumption. For example, the multi-fuel control system may reduce specific fuel consumption (SFC) while maintaining peak firing pressure (PFP), turbocharger rotational speed-turbospeed (TRBSPD), pre-turbine temperature (PTT), and maximum fuel injection pressure ($P_{INJMAX}$) within acceptable limits (e.g., maximum threshold values or design limits) in response to use of the different fuels. For example, the multi-fuel control system may enable the system to operate with a variety of standard and alternative fuels. As discussed in detail below, the multi-fuel control system may utilize a variety of control schemes to account for the effects of different fuel characteristics, e.g., viscosity, compressibility, density, lower heating value (LHV), and so forth. In addition, certain embodiments of the system simultaneously control various parameters to reduce exhaust emissions, such as nitrogen oxides, particulate matter, hydrocarbons, carbon monoxide, or a combination of two or more thereof.

Figure 1:
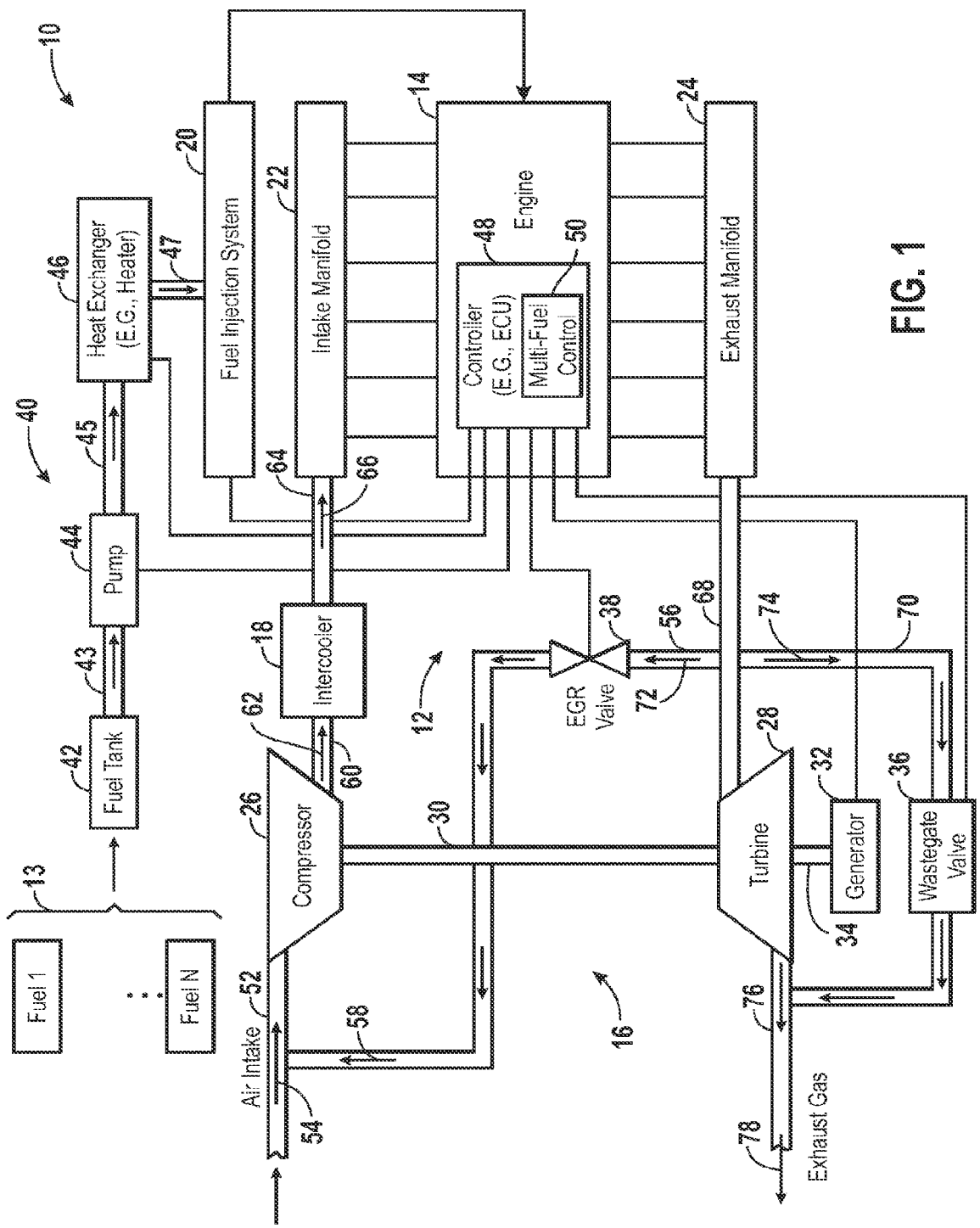
FIG. 1 is a block diagram illustrating a system having a multi-fuel control system coupled to a turbocharged engine in accordance with certain embodiments of the present technique.

With reference to FIG. 1, a block diagram illustrates a system 10 having a multi-fuel control system 12 in accordance with an embodiment of the invention. The multi-fuel control system is associated with a multi-fuel source 13 and is coupled to a turbocharged engine 14 that is fueled by the multi-fuel source. The multi-fuel control system can adjust various engine parameters to account for fuel characteristics associated with the different fuel types and/or may select the type of fuel or the fuel ratio of the fuel types from the multi-fuel source to achieve a desired engine operation state. This may enable the engine to operate with a plurality of different fuels while using the fuels in a plurality of ratios and combinations to achieve a desired engine operational state.

As illustrated, the engine system includes a turbocharger 16, an intercooler 18, a fuel injection system 20, an intake manifold 22, and an exhaust manifold 24. The illustrated turbocharger includes a compressor 26 coupled to a turbine 28 via a drive shaft 30. The system also includes an electrical generator 32 coupled to the turbine 28 via a shaft 34. In addition, the system may include a wastegate valve 36 and an exhaust gas recirculation (EGR) valve 38 disposed downstream from the exhaust manifold 24. In the illustrated embodiment, the wastegate valve 36 is disposed between an upstream side and a downstream side of the turbine 28. The illustrated EGR valve 38 is disposed downstream from the exhaust manifold 24 and upstream from the compressor 26. As discussed in further detail below, the generator 32, the wastegate valve 36, and/or the EGR valve 38 may be selectively engaged to control parameters of the system to account for different fuel characteristics. For example, the electrical generator 32 and/or the wastegate valve 36 may be selectively engaged to reduce the speed of the turbine, thereby reducing the speed of the compressor, reducing the manifold air pressure (MAP), providing a richer fuel/air mixture and decreasing the peak firing pressure (PFP). Similarly, the EGR valve 38 may be selectively engaged to reduce the speed of the turbine, while also adding heat and recirculating a portion of the exhaust gases into the air intake.

The illustrated system further includes a fuel supply system 40 coupled to the fuel injection system 20. The fuel supply system optionally may include a plurality of fuel tanks corresponding to the different fuel types, associated fuel pumps, heat exchangers, and associated conduits as needed for specific implementations (none shown). A conduit 47 couples the multi-fuel source to the fuel injection system 20. If present, the heat exchanger may use the heat of the exhaust gas (or other heat source) to heat the fuel. Heating the fuel may reduce the viscosity, affect the density, and/or induce a phase change. The fuel pump and the heat exchanger may vary the fuel supply pressure, the fuel flow rate(s), and the fuel supply temperature(s) to account for characteristics of the different fuels. For example, if one fuel is more viscous than an another fuel, then the multi-fuel control system may engage the heat exchanger to increase the fuel supply temperature of the viscous fuel to reduce the viscosity and fuel injection pressure. By further example, the multi-fuel control system may engage the fuel pump to increase the fuel supply pressure to reduce the fuel injection duration. In either case, the multi-fuel control system may control the pump and the heat exchanger to maintain the maximum fuel injection pressure ($P_{INJMAX}$) within design limits or below threshold values, while also improving the specific fuel consumption (SFC). The control of the pump 44 and the heat exchanger 46 also may be used to control the fuel injection in a manner that changes the fuel/air mixture, fuel/fuel ratio, combustion duration, peak firing pressure (PFP), peak firing temperature (PTT), exhaust emissions constituent profile, and so forth.

The system also includes an engine controller 48, e.g., an electronic control unit (ECU), having a multi-fuel control 50 as part of the multi-fuel control system. The engine controller is coupled to various sensors and components throughout the system, such that the multi-fuel control (and the control system as a whole) can respond to the effects of different fuels used in the engine. More specifically, as discussed further below, the multi-fuel control responds to various sensed parameters to identify possible critical conditions (e.g., approaching or exceeding limits) and take corrective actions to avoid such conditions. However, in the absence of these conditions, the multi-fuel control may improve specific fuel consumption (SFC). The improved SFC can be total for the whole engine, or can be for one of the fuels preferentially over the other fuel(s). In the illustrated embodiment, the engine controller is coupled to and configured to control the pump, the heat exchanger, the fuel injection system, the EGR valve, the generator, and the wastegate valve.

In various embodiments, the sensors may include fuel sensors, fuel injection sensors, engine intake sensors, engine combustion sensors, engine exhaust sensors, turbocharger sensors, and so forth. The fuel sensors may include a fuel supply pressure sensor, a fuel supply temperature sensor, and a fuel type supply sensor. The fuel injection sensors may include a fuel injection pressure sensor, a fuel injection flow rate sensor, a fuel injection timing sensor, and a fuel injection duration sensor. The engine intake sensors may include an air intake temperature sensor and an air intake pressure sensor. The engine exhaust sensors may include an exhaust temperature sensor, an exhaust pressure sensor, and exhaust pollutant sensors. The exhaust pollutant sensors may send a signal to the controller that is operable to determine an exhaust emission parameter, which may include concentrations of nitrogen oxide, particulate matter, hydrocarbons, carbon monoxide, and/or other pollutants. The engine combustion sensors may include a peak firing pressure (PFP) sensor and a peak firing temperature (PFT) sensor to detect peak conditions within a combustion chamber of the engine. In some examples, the peak firing pressure sensor may also be used to determine a rate of pressure rise within a combustion chamber of the engine. In an example, the engine combustion sensors may also include a knock sensor to detect knock intensity of the combustion chamber. Knock In other examples, knock intensity may be determined from a pressure trace based on output from the peak firing pressure sensor or other suitable pressure sensor. The turbocharger sensors may include temperature sensors, pressure sensors, and speed sensors for both the compressor 26 and the turbine 28.

In the illustrated embodiment of FIG. 1, the system intakes air into the compressor through a conduit 52 as illustrated by arrow 54. In addition, as discussed further below, the compressor may intake a portion of the exhaust from the exhaust manifold though a conduit 56 via control of the EGR valve 38 as indicated by arrow 58. In turn, the compressor compresses the intake air and the portion of the engine exhaust and outputs the compressed gas to the intercooler via a conduit 60 as indicated by arrow 62. The intercooler functions as a heat exchanger to remove heat from the compressed gas as a result of the compression process. The compression process may heat up the intake air and the portion of exhaust gas. This may be cooled prior to intake into the intake manifold. The compressed and cooled air passes from the intercooler to the intake manifold via a conduit 64 as indicated by arrow 66.

The intake manifold then routes the compressed gas into the engine. In addition, the fuel supply system provides the different fuels to the fuel injection system, which in turn provides the fuel into the cylinders of the respective piston cylinder assemblies of the engine. The engine then compresses this mixture of fuels, exhaust gas, and air within various piston cylinder assemblies. The controller may control the fuel injection timing of the fuel injection system, such that the fuel is injected at the appropriate time into the engine.

In response to changes in the delivered fuel (e.g., different fuel characteristics), the multi-fuel control may adjust various aspects of the engine operation. The engine operation aspects that the multi-fuel control may adjust include the fuel injection timing, the fuel injection duration, the fuel supply pressure, the fuel supply temperature, the fuel injection flow rate, or the like. For example, as mentioned above, the engine controller may adjust the fuel supply rate of one or both of the different fuels. These adjustments may account for different fuel characteristics, such as viscosity, compressibility, density, lower heating value (LHV), and so forth. The multi-fuel control may change the fuel ratio of the first fuel to the second fuel supplied to the cylinder, and then respond to sensed engine operation parameters so that the change in the fuel ratio does not damage the engine or other components of the system. For example, if the multi-fuel control simply made a 1:1 swap of a low energy fuel for a high energy fuel, the resulting increase in peak pressure in the cylinder may cause damage. Accordingly, as the energy content of the fuel supplied to the cylinder is changed, the multi-fuel control makes corresponding changes to other aspects of the system—such as, the amount of air being delivered, the injection duration, the injection timing, and the like. The converse effect may be provided by the multi-fuel control. That is, if the operation of the engine may cause damage, the multi-fuel control may change the fuel ratio, flow rates, or fuel types to place the engine operation into a safer envelop that is less likely to cause engine damage.

If the engine is a compression-ignition engine, then the heat of the compressed air ignites the fuel as each piston compresses a volume within its corresponding cylinder. If the engine is a spark-ignition engine, then a spark ignites the fuel as each piston compresses a volume within its corresponding cylinder. In either case, the combustion of the fuel leads to the peak firing pressure (PFP) and peak firing temperature (PFT) within the volume between each piston and its corresponding cylinder. A change in the supplied fuel characteristics (fuel type, ratio, or amount) can cause changes in the combustion process, including increases or decreases in the peak firing pressure (PFP) and peak firing temperature (PFT). The multi-fuel control can adjust a variety of parameters to account for these changes in the combustion process. This can maintain the combustion process within design limits or below threshold values to avoid engine or system damage, or other undesirable effect.

The multi-fuel control also can reduce or minimize specific fuel consumption (SFC). The fuel consumption can be the total fuel consumed, or can be weighted to prefer one fuel type relative to another fuel type. For example, the multi-fuel control may adjust fuel injection timing, injection duration, fuel flow rates, fuel ratios, and engine speed to affect the fuel consumption rate. The multi-fuel control can determine if the peak firing pressure (PFP) is not greater than a design limit or threshold value, and if not then can put the engine in a first operating mode. But, if the peak firing pressure (PFP) is greater than the threshold value the multi-fuel control may retard the fuel injection timing. This may reduce engine wear and minimize engine damage, but this may be at the cost of a higher fuel consumption rate.

The engine exhausts the products of combustion from the various piston cylinder assemblies through the exhaust manifold. The exhaust from the engine then passes through the conduit 68 from the exhaust manifold to the turbine. The exhaust gas drives the turbine, such that the turbine rotates the shaft and drives the compressor. The speed of both the turbine and the compressor depends on the pressure and flow rate of exhaust gas. In certain conditions, the system diverts a portion of the exhaust gas away from the turbine via the conduit 56 to the EGR valve 38 and/or a conduit 70 to the wastegate valve, as illustrated by arrows 72 and 74, respectively. As a result, the diversion of exhaust gas causes a decrease in speed of both the turbine and its driven compressor. As discussed further below, this exhaust gas diversion may be employed to reduce the rotational speed of the turbocharger, reduce the manifold air pressure (MAP), provide a richer fuel/air mixture, provide a different fuel ratio of the first fuel relative to the second fuel, and reduce the peak firing pressure (PFP) to account for different fuel characteristics. In addition, the generator may load the turbine, thereby effectively reducing the turbospeed in response to the multi-fuel control signal based at least in part on the fuel characteristics. The exhaust gas passes out of the turbine and the wastegate valve via conduit 76, as indicated by arrow 78.

Figure 2:
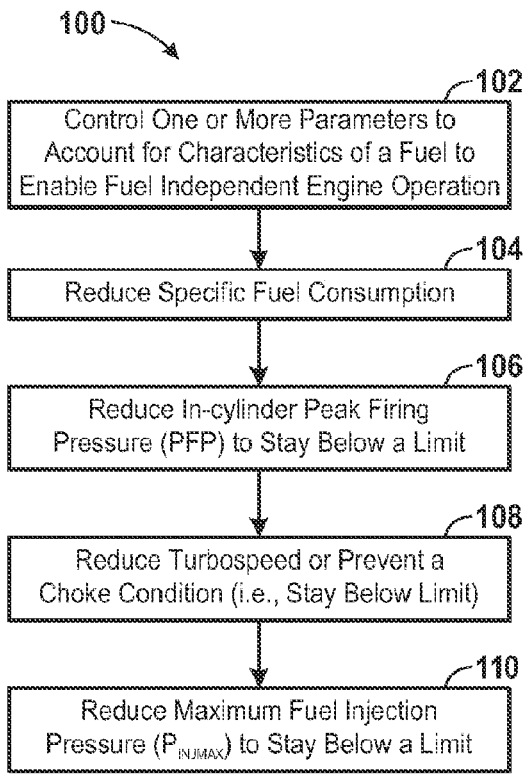
FIGS. 2, 3 and 4 are flow charts illustrating various processes of operating a turbocharged engine for use with a plurality of different fuels in accordance with certain embodiments of the present technique.

FIG. 2 is a flowchart illustrating a process 100 for operating an engine with different types of fuels in accordance with certain embodiments of the present technique. In certain embodiments, the process 100 may be a computer-implemented process, e.g., executable on the multi-fuel control 50 of the engine controller as illustrated in FIG. 1. Thus, the process 100 may include various code, instructions, lookup tables, databases, and the like, disposed on a computer-readable medium, such as memory of the multi-fuel control. In addition, the multi-fuel control may implement the process at least partially by interfacing with a plurality of sensors distributed throughout the system. For example, the multi-fuel control may receive operational data from sensors distributed throughout the engine, the turbocharger, the fuel injection system, the fuel supply system, the intake manifold, the exhaust manifold, the exhaust lines, and the like. The multi-fuel-control may implement the process by acquiring real-time operational data from the system, evaluating the data against stored data (e.g., databases, lookup tables, threshold values, equations, etc.), and outputting appropriate control signals to the components in the system. For example, as discussed in detail below, the multi-fuel-control may implement the process to reduce exhaust emissions, reduce specific fuel consumption (SFC), and maintain the components within design limits or below threshold values for any selected fuel.

As illustrated, the process includes control of one or more parameters to account for characteristics of a fuel to enable fuel independent engine operation (block 102). For example, block 102 may include control steps to account for viscosity, compressibility, density, lower heating value (LHV), among other fuel characteristics. Thus, block 102 may include changing the fuel supply temperature, the fuel supply pressure, the fuel supply flow rate, or a fuel ratio. The process 100 also includes a control block 104 to reduce specific fuel consumption (SFC). In certain embodiments, the control block 104 also may control various parameters to reduce one or more emission parameters, such as nitrogen oxides, particulate matter, hydrocarbons, carbon monoxide, or a combination thereof. The process 100 further includes a control block 106 to reduce an in-cylinder peak firing pressure (PFP) to stay below a limit. At control block 108, the process 100 may reduce a turbospeed (TRBSPD) and/or prevent a choke condition (i.e., stay below a limit). At control block 110, the process may reduce a maximum fuel injection pressure ($P_{INJMAX}$) to stay below a limit. In certain embodiments, the control blocks 104, 106, 108, and 110 are interrelated with one another and the initial control block 102. In other words, a variety of control measures may be taken to control the SFC, PFP, TRBSPD, and $P_{INJMAX}$, alone or in combination with one another.

These control measures may include control of the fuel supply system, the fuel injection system, the turbocharger, and so forth. For example, as mentioned above, the control measures may include increasing or decreasing the fuel supply temperature, the fuel supply pressure, the fuel ratio, the fuel supply flow rate, or a combination thereof, via control of fuel pumps. In certain embodiments, the change in temperature, pressure, and flow rate causes a change in the pressure, duration, and quantity of each fuel during a fuel injection or cylinder cycle, thereby altering the fuel/fuel and fuel/air mixtures, the combustion duration, the peak firing pressure (PFP), and so forth. The control measures also may include advancing or retarding the fuel injection timing (e.g., advance angle) relative to the top dead center (TDC) position of the piston in the cylinder. In certain embodiments, the control measures may advance fuel injection timing to reduce the specific fuel consumption (SFC) and/or increase the peak firing pressure (PFP). Alternatively, the control measures may retard fuel injection timing to reduce the peak firing pressure (PFP) to stay within the design limits. By further example, the control measures may include diverting exhaust from the turbine 28 via the wastegate valve 36 and/or the EGR valve 38, thereby reducing the TRBSPD, reducing the manifold air pressure (MAP), increasing the fuel/air mixture (i.e., more fuel per air), and reducing the peak firing pressure (PFP). The control measures also may include engaging the electrical generator 32 to add a load onto the turbine 28, thereby reducing the TRBSPD, reducing the manifold air pressure (MAP), increasing the fuel/air mixture (i.e., more fuel per air), and reducing the peak firing pressure (PFP). Alternatively, the control measures may reduce the diversion of exhaust gases and/or disengage the generator 32 to provide the opposite results. Again, a variety of control measures may be taken to maintain parameters within design limits or below threshold values. This may be done while reducing specific fuel consumption (SFC) for each different fuel used with the engine, or by preferentially using one or the other fuel of the different fuel types.

Figure 3:
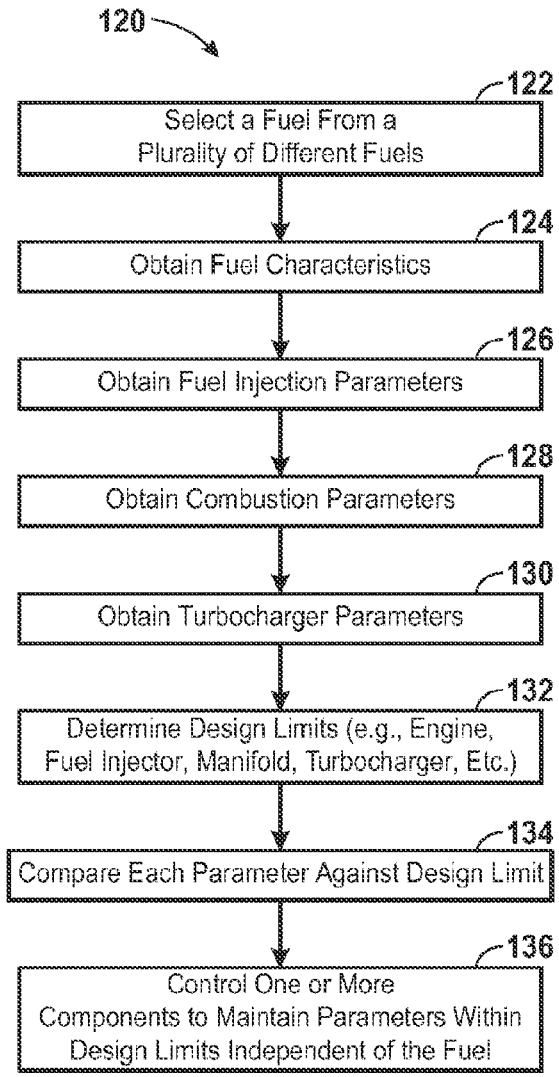

FIG. 3 is a flow chart illustrating a process 120 of operating an engine with a plurality of different fuels in accordance with certain embodiments of the present technique. In certain embodiments, the process may be a computer-implemented process, e.g., executable on the multi-fuel control of the engine controller as illustrated in FIG. 1. Thus, the process may include various code, instructions, lookup tables, databases, and the like, disposed on a computer-readable medium, such as memory of the multi-fuel control. In addition, the multi-fuel control may implement the process at least partially by interfacing with a plurality of sensors distributed throughout the system. For example, the multi-fuel control may receive operational data from sensors distributed throughout the engine, the turbocharger, the fuel injection system, the fuel supply system, the intake manifold, the exhaust manifold, the exhaust lines, and the like. Thus, the multi-fuel-control may implement the process by acquiring real-time operational data from the system, evaluating the data against stored data (e.g., databases, lookup tables, design limits, equations, etc.), and outputting appropriate control signals to the components in the system. For example, as discussed in detail below, the multi-fuel-control may implement the process to reduce exhaust emissions, reduce specific fuel consumption (SFC), and maintain the components within design limits or within a determined range of threshold values for any selected fuel.

As illustrated, the process includes a first control block 122 to select a fuel from a plurality of different fuels, such as diesel, gasoline, marine fuel, vegetable oils, biodiesel fuels, and so forth. The process also includes control blocks 124, 126, 128, and 130 to acquire various parameters and characteristics to control the engine in response to the selected fuels. Again, as mentioned above, these various parameters may be acquired from at least one of a database, a lookup table, a sensor, or the like. Thus, the acquired data may correspond to previously stored data as well as real-time operation data.

For example, block 124 obtains fuel characteristics such as viscosity, compressibility, density, and lower heating value (LHV). Block 126 obtains fuel injection parameters, such as fuel injection timing, fuel injection pressure, fuel injection temperature, fuel injection flow rate, fuel injection duration, and so forth. Block 128 obtains combustion parameters, such as peak firing pressure (PFP), peak firing temperature (PFT), combustion duration, rate of pressure rise, knock intensity, exhaust emission parameters, and so forth. Block 130 obtains turbocharger parameters, such as the rotational speed of the turbocharger, inlet and outlet temperatures, inlet and outlet pressures, and other desired parameters, of the compressor, the turbine, or both. At block 132, the process proceeds to determine threshold values, such as engine threshold values, fuel injector threshold values, manifold threshold values, turbocharger threshold values, knock threshold values, and so forth. For example, the threshold values may correspond to peak pressures, peak temperatures, peak speeds, and so forth. At block 134, the process compares each parameter against a corresponding threshold value. For example, block 134 may compare an actual peak firing pressure (PFP) against a threshold value. Similarly, block 134 may compare an actual rotational speed of the turbocharger against a corresponding rotational speed threshold value. Furthermore, block 134 may compare an actual maximum fuel injection pressure against a pressure threshold value. Block 134 may additionally or alternatively compare an actual rate of pressure rise to a rate of pressure rise threshold value, compare an actual knock intensity to a knock intensity threshold value, compare an actual pre-turbine temperature to a pre-turbine temperature threshold value, and/or compare an actual exhaust emission parameter to an exhaust emission parameter value. These are merely examples of potential comparisons of parameters with their respective threshold value. At block 136, the process proceeds to control one or more components to maintain parameters within a range of acceptable threshold values independent of the fuel. Again, as discussed above with reference to FIG. 2, the process may adjust a variety of operational parameters to control the SFC, PFP, TRBSPD, knock intensity, exhaust emission parameter, rate of pressure rise, and $P_{INJMAX}$, alone or in combination with one another. In one example, knock intensity greater than the knock intensity threshold limit may result in injection timing of one or more of the fuels being adjusted, e.g., retarded.

Figure 4:
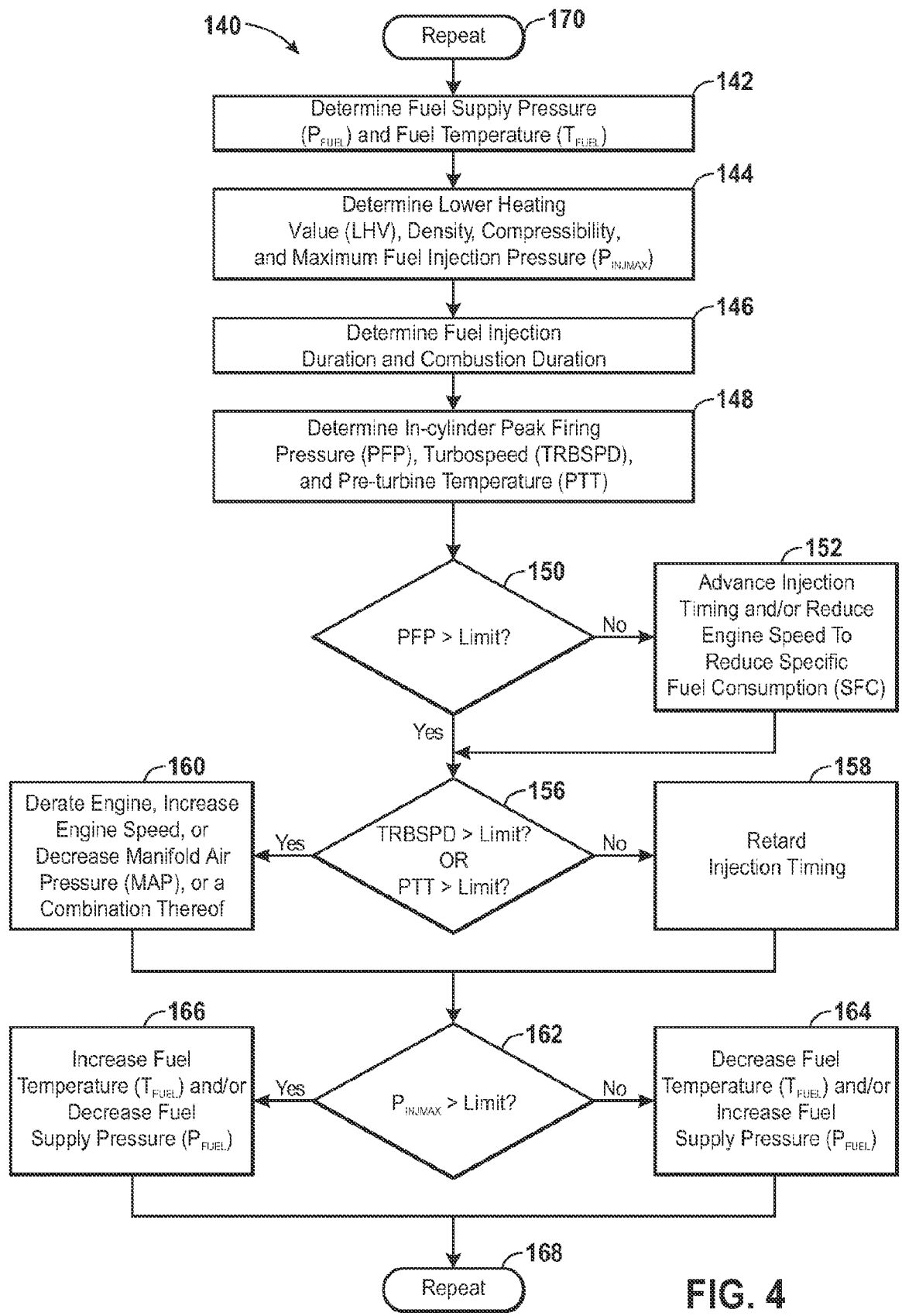

FIG. 4 is a flow chart illustrating a process 140 of operating an engine to account for the effects of changing fuels in an engine in accordance with certain embodiments of the present technique. In certain embodiments, the process may be a computer-implemented process, e.g., executable on the multi-fuel control of the engine controller as illustrated in FIG. 1. Thus, the process may include various code, instructions, lookup tables, databases, and the like, disposed on a computer-readable medium, such as memory of the multi-fuel control. In addition, the multi-fuel control may implement the process at least partially by interfacing with a plurality of sensors distributed throughout the system. For example, the multi-fuel control may receive operational data from sensors distributed throughout the engine, the turbocharger, the fuel injection system, the fuel supply system, the intake manifold, the exhaust manifold, the exhaust lines, and the like. Thus, the multi-fuel-control may implement the process by acquiring real-time operational data from the system, evaluating the data against stored data (e.g., databases, lookup tables, threshold values, equations, etc.), and outputting appropriate control signals to the components in the system. For example, as discussed in detail below, the multi-fuel-control may implement the process to reduce exhaust emissions, reduce specific fuel consumption (SFC), and maintain the components within threshold values for any selected fuel.

As illustrated, the process includes a control block 142 to determine fuel supply pressure ($P_{FUEL}$) and fuel temperature ($T_{FUEL}$). For example, the control block 142 may include monitoring a fuel pressure sensor and a fuel temperature sensor in the fuel supply system as illustrated in FIG. 1. The process also includes a control block 144 to determine a lower heating value (LHV), density, compressibility, and/or maximum fuel injection pressure ($P_{INJMAX}$). In certain embodiments, the control block 144 may automatically sense a fuel types and access the fuel characteristics for those fuel types from a lookup table.

Alternatively, the process may include user input to acquire the fuel characteristics. For example, a user may enter or select one or more fuel types and the fuel characteristics can be retrieved from a lookup table. In addition, the control block 144 may sense or monitor one or more of the fuel characteristics, such as the fuel injection pressure ($P_{INJMAX}$) during operation of the engine. The process includes a control block 146 to determine a fuel injection duration and a combustion duration. For example, the control block 146 may include sensors to calculate a beginning, an end, and thus a duration of the fuel injection and the combustion. In certain embodiments, the control block 146 may estimate the fuel injection duration and/or the combustion duration based on other parameters, such as stored data, sensed data, equations, and so forth. At control block 148, the process 140 proceeds to determine an in-cylinder peak firing pressure (PFP), a rotational speed of the turbocharger-turbospeed (TRBSPD), and a pre-turbine temperature (PTT). Again, the control block 148 may include a pressure sensor, a speed sensor, a flow rate sensor, and a temperature sensor to monitor and acquire each of these values during operation of the engine.

At query block 150, the process evaluates whether the peak firing pressure (PFP) is greater than a limit. If the peak firing pressure is not greater than the limit at block 150, then the process proceeds to advance injection timing and/or reduce engine speed to reduce the specific fuel consumption (SFC) at control block 152. In addition to reducing the specific fuel consumption (SFC) at control block 152, the above control measures may cause an increase in the peak firing pressure (PFP). If the peak firing pressure is greater than the limit at block 150, then the process proceeds to query block 156 to evaluate additional parameters against respective limits. At query block 156, the process evaluates whether or not the turbospeed (TRBSPD) is greater than a limit or the pre-turbine temperature (PTT) is greater than a limit. If these limits are not exceeded at query block 156, then the process proceeds to retard the injection timing at control block 158. By retarding the injection timing, the control block 158 reduces the peak firing pressure (PFP). As appreciated, in certain embodiments, this control block 158 may be performed directly in response to query block 150 when the peak firing pressure (PFP) is greater than a limit.

If the rotational speed of the turbocharger (TRBSPD) is greater than a corresponding rotational speed limit or the pre-turbine temperature (PTT) is greater than a corresponding temperature limit at query block 156, then the process 140 responds accordingly. Suitable responses include proceeding to change the fuel flow rate of one or more of the fuel types, derate the engine, change the engine speed, or change the manifold air pressure (MAP), or a combination thereof, at control block 160. For example, as discussed above, the control block 160 may reduce the speed of the turbocharger (TRBSPD) by diverting exhaust gases via the wastegate valve and/or the EGR valve, or by adding a load via the generator, or a combination thereof. In turn, the reduced speed of the turbocharger 16 may cause a decrease in the manifold air pressure (MAP), an increase in the fuel/air mixture (i.e., more fuel per air), and so forth. Furthermore, in certain embodiments, the process may provide control measures opposite from block 160 if the limits are not exceeded at query block 156, thereby supplementing or replacing the control measures shown in the control block 158.

The process proceeds to query block 162 for an evaluation of fuel injection characteristics. At query block 162, the process evaluates whether or not the maximum fuel injection pressure (PINJMAX) is greater than a limit. If the limit is not exceeded at query block 162, then the process proceeds to decrease a fuel temperature (TFUEL) and/or increase a fuel supply pressure (PFUEL) at block 164. Otherwise, if the limit is exceeded at query block 162, then the process proceeds to increase the fuel temperature and/or decrease the fuel supply pressure at control block 166. At this point, the process of the illustrated embodiment repeats as illustrated by blocks 168 and 170.

Figure 5:
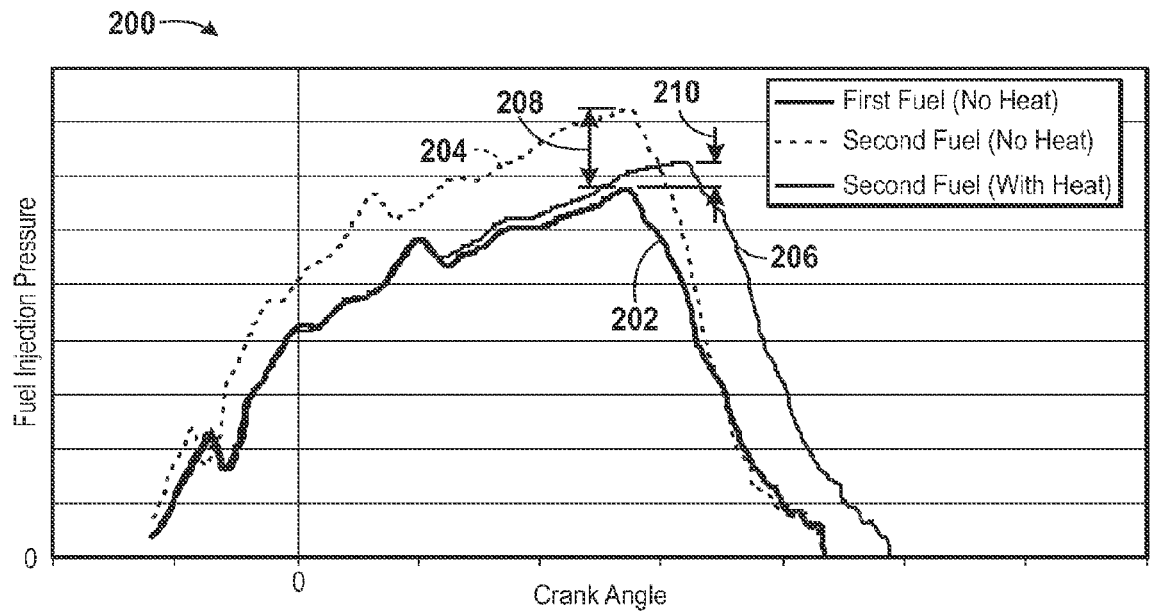
FIG. 5 is a graph of fuel injection pressure versus crank angle of different fuels illustrating the effects of heating the fuel to reduce the fuel injection pressure in accordance with certain embodiments of the present technique.

FIG. 5 is a graph 200 of fuel injection pressure versus crank angle for different fuels illustrating the effects of heating the fuel on the fuel injection pressure in accordance with certain embodiments of the present technique. As illustrated, plot 202 illustrates a first fuel without any heating by a heat exchanger. Plots 204 and 206 illustrate a second fuel different from the first fuel, wherein plot 204 illustrates the fuel without heating and plot 206 illustrates the fuel with heating (e.g., 100 degrees Celsius).

As illustrated by comparison of plot 202 and 204, the second fuel has a greater maximum fuel injection pressure (PINJMAX) relative to the first fuel as illustrated by arrow 208. However, without heating, both the first and second fuels have very similar fuel injection durations as illustrated by the plots 202 and 204. With heating (e.g., 100 degrees Celsius), the second fuel has a reduced maximum fuel injection pressure (PINJMAX), which is closer to that of the first fuel as indicated by arrow 210. Thus, as illustrated by the graph 200, the second fuel may be heated in accordance with one of the described multi-fuel control systems or methods to reduce the maximum fuel injection pressure (PINJMAX) to stay within a range of threshold values.

Figure 6:
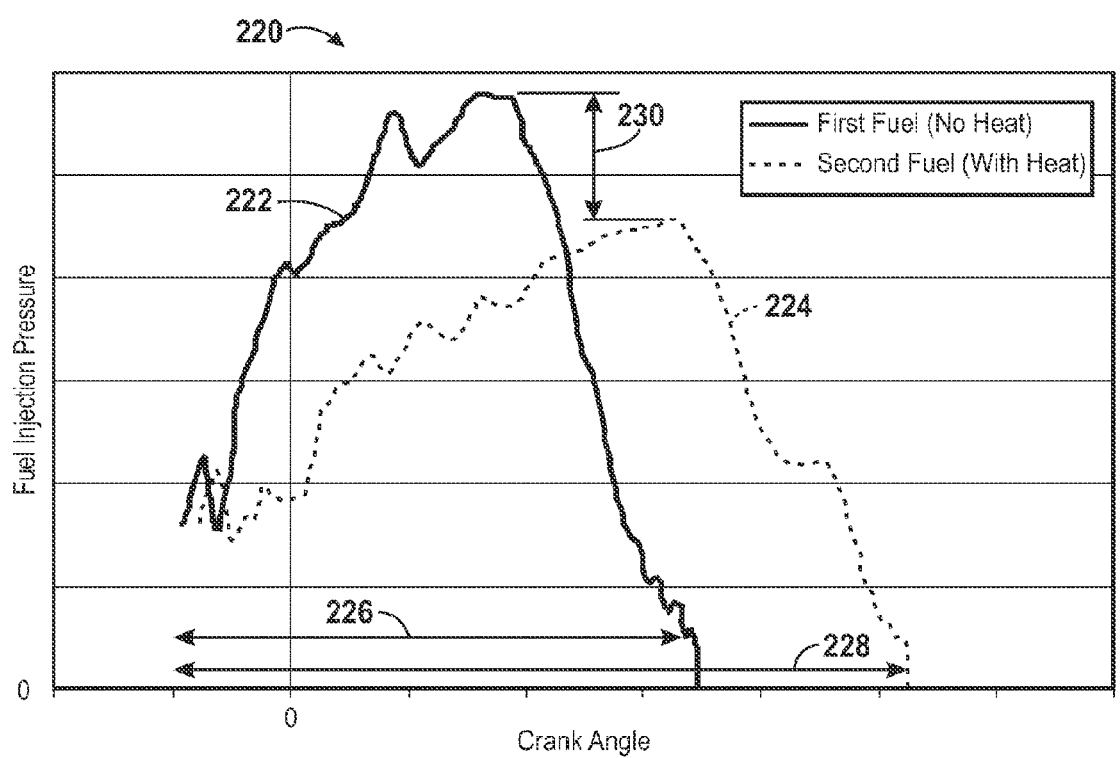
FIG. 6 is a graph of fuel injection pressure versus crank angle of different fuels illustrating the effects of heating the fuel on the fuel injection duration in accordance with certain embodiments of the present technique.

FIG. 6 is a graph 220 of fuel injection pressure versus crank angle for different fuels illustrating the effects of heating the fuel on the fuel injection duration in accordance with certain embodiments of the present technique. In the illustrated embodiment, plot 222 corresponds to a first fuel without heating, while plot 224 illustrates a second fuel with even more heating than described above. Similar to the embodiment discussed above with reference to FIG. 5, the first fuel may be diesel fuel and the second fuel may be natural gas. In the illustrated embodiment, the second fuel may be heated from a cryogenic or liquid state to a gaseous state. As shown, the first fuel of plot 222 has a fuel injection duration as indicated by arrow 226, while the second fuel of plot 224 has a fuel injection duration indicated by arrow 228. The illustrated fuel injection duration 228 of the heated second fuel 224 is greater than the fuel injection duration 226 of the unheated first fuel 222. However, the heated second fuel of plot 224 has a lower maximum fuel injection pressure ($P_{INJMAX}$) than the unheated first fuel of plot 222, as indicated by arrow 230. This is due to second fuel being heated more than necessary. As a result, the fuel heating associated with the previously described multi-fuel control systems and methods resulted in a lower maximum fuel injection pressure ($P_{INJMAX}$) and a greater fuel injection duration in the embodiment of FIG. 6.

Figure 7:
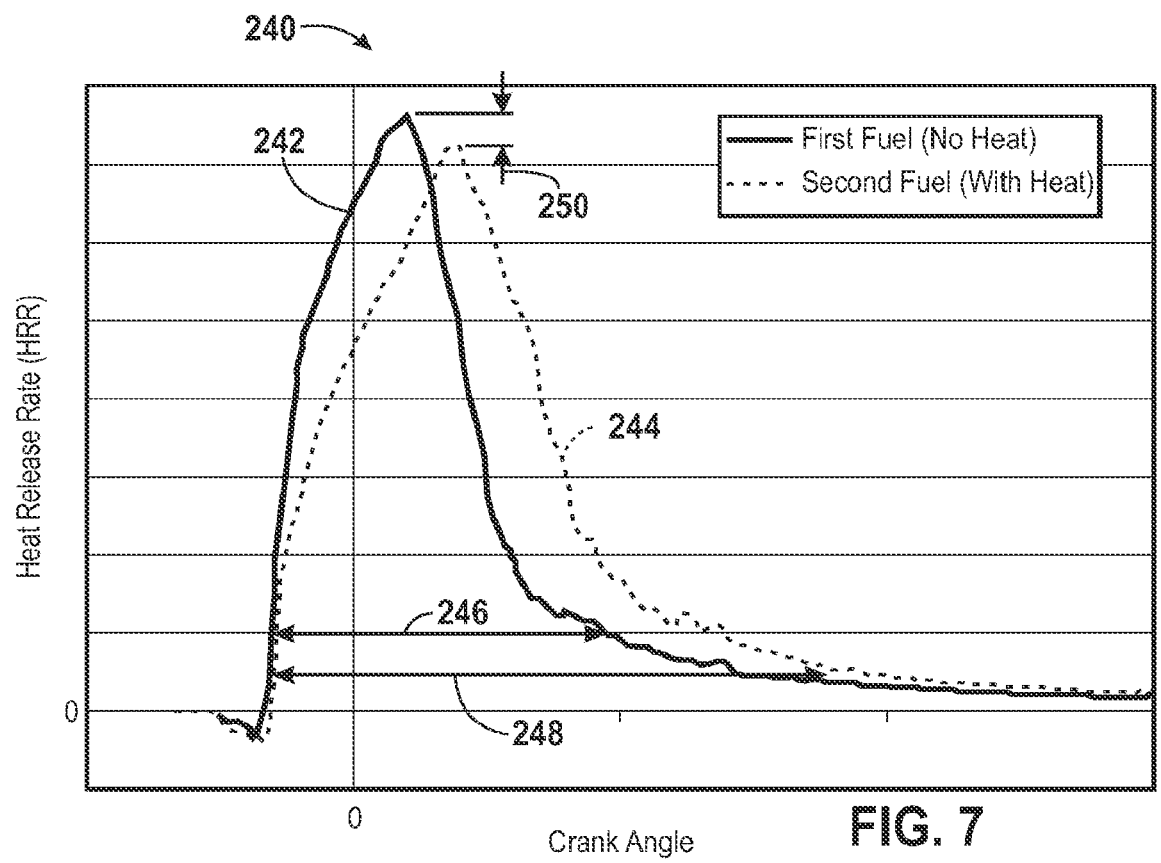
FIG. 7 is a graph of heat release rate versus crank angle for different fuels illustrating the effects of heating the fuel on the combustion duration in accordance with certain embodiments of the present technique.

FIG. 7 is a graph 240 of heat release rate (HRR) versus crank angle for different fuels illustrating the effects of heating on the combustion duration in accordance with certain embodiments of the present technique. As illustrated, plot 242 corresponds to a first fuel without heating and plot 244 corresponds to a second fuel with heating and after a phase change. As illustrated in FIG. 7, the heat release rates of the first and second fuels begin at about the same crank angle but end at different crank angles as illustrated by the horizontal shift on the right portion of plot 244 relative to the plot 242. The first fuel of the plot 242 has a combustion duration illustrated by arrow 246, while the second fuel of the plot 244 has a combustion duration generally illustrated by arrow 248. As illustrated, the combustion duration 248 may be greater than the combustion duration 246. In addition, the maximum heat release rate of the first fuel of plot 242 is greater than the maximum heat release rate of the second heated fuel of plot 244 as indicated by arrow 250. Again, in accordance with the previously described multi-fuel control systems and methods, the temperature of the second fuel of plot 244 may be varied to change the heat release rate, the combustion duration, and the associated peak firing temperature (PFT) during the combustion process, thereby adapting the second fuel to the limitations of the engine.

Figure 8:
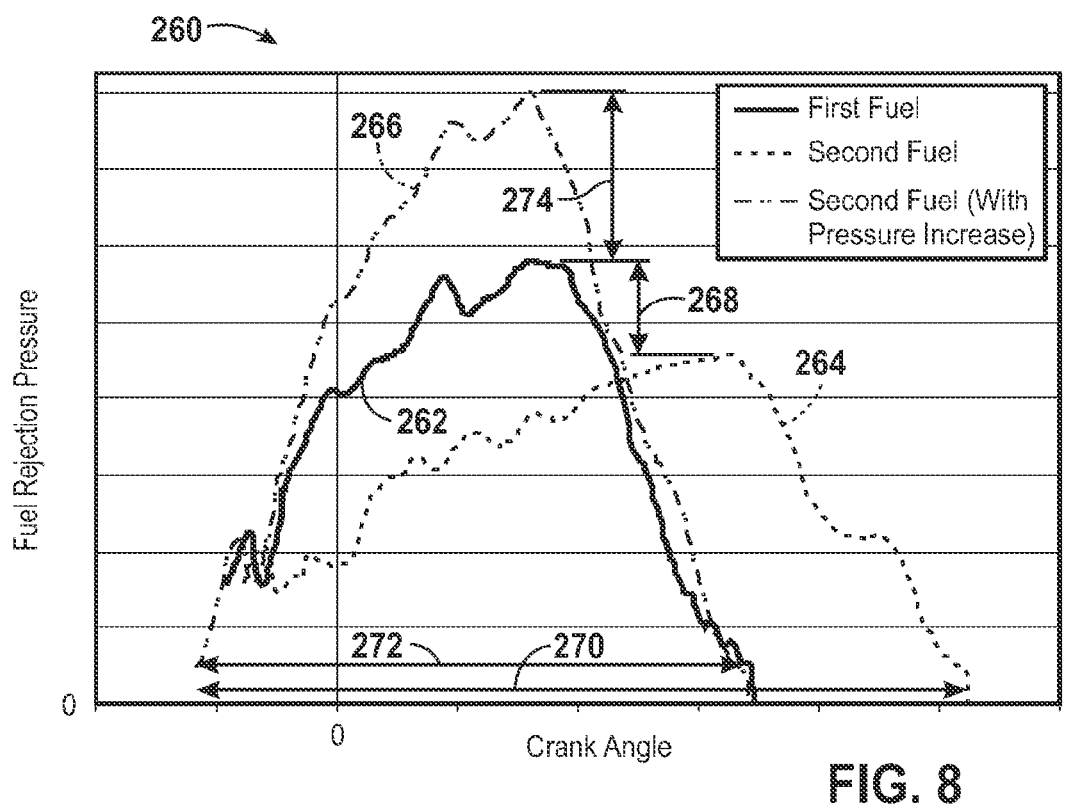
FIG. 8 is a graph of fuel injection pressure versus crank angle of different fuels illustrating the effects of increasing the fuel injection pressure on the fuel injection duration in accordance with certain embodiments of the present technique.

FIG. 8 is a graph 260 of fuel injection pressure versus crank angle of different fuels illustrating the effects of fuel supply pressure on the maximum fuel injection pressure ($P_{INJMAX}$) and the fuel injection duration in accordance with certain embodiments of the present technique. As illustrated, the graph 260 includes a plot 262 corresponding to a first fuel and plots 264 and 266 corresponding to a second fuel. Specifically, as discussed in the previous embodiments of FIGS. 5-7, the first fuel may correspond to a diesel fuel, and the second fuel may correspond to a vegetable oil, such as palm oil. In the illustrated embodiment, the plot 264 corresponds to the second fuel without an increase in the fuel supply pressure. In contrast, the plot 266 corresponds to the second fuel with an increase in the fuel supply pressure, e.g., 1600 bar. As illustrated by plots 262 and 264, the second fuel of plot 264 has a relatively lower maximum fuel injection pressure than the first fuel of plot 262, as indicted by arrow 268. However, the second fuel of plot 264 also has a relatively greater fuel injection duration than the first fuel of plot 262 as indicated by arrows 270 and 272, respectively. These differences between the first and second fuels can be changed by varying the fuel supply pressure of the second fuel, as illustrated by the changes between the plots 264 and 266 of the second fuel. With reference to plots 262 and 266, the fuel injection duration of the first and second fuels are substantially the same and the second fuel has a greater maximum fuel injection pressure ($P_{INJMAX}$) than the first fuel as indicated by arrow 274. Thus, in accordance with certain aspects of the previously described multi-fuel control systems and methods, the fuel supply pressure of the second fuel may be increased to both reduce the fuel injection duration and increase the maximum fuel injection pressure ($P_{INJMAX}$) to adapt the second fuel to the design limits of the engine.

Figure 9:
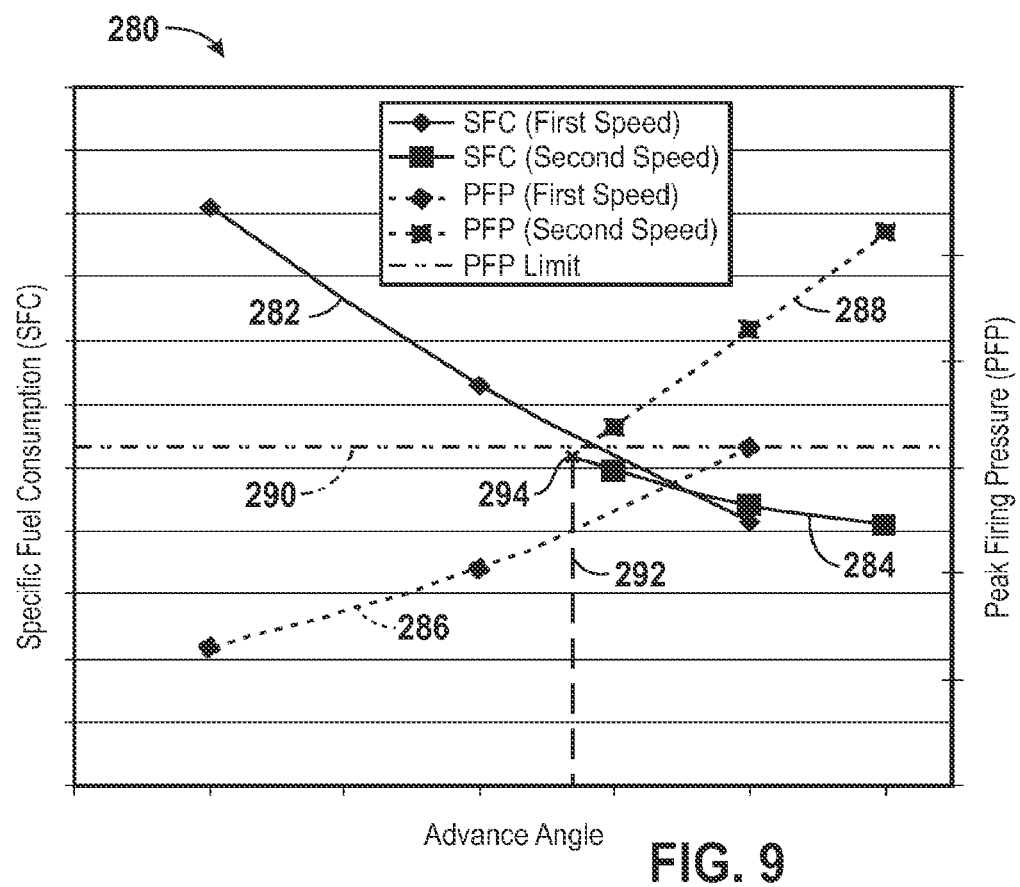
FIG. 9 is a graph of specific fuel consumption (SFC) and peak firing pressure (PFP) versus advance angle of an engine for different speeds in accordance with certain embodiments of the present technique.

FIG. 9 is a graph 280 of specific fuel consumption (SFC) and peak firing pressure (PFP) versus advance angle for different engine speeds of a fuel in accordance with certain embodiments of the present technique. The advance angle may be defined as the angle before top dead center (TDC) at which fuel injection begins. In the graph 280, plots 282 and 284 correspond to the specific fuel consumption (SFC) at first and second engine speeds, respectively. In addition, plots 286 and 288 correspond to the peak firing pressure (PFP) at the first and second engine speeds, respectively. The graph 280 further illustrates a peak firing pressure (PFP) limit, such as a design limit, as indicated by horizontal line 290. In the embodiment of FIG. 9, the fuel illustrated by plots 282, 284, 286, and 288 may correspond to the same second fuel as illustrated in FIGS. 5-8. For example, the fuel may correspond to a vegetable oil, such as palm oil. In general, the plots 282 and 284 illustrate a decrease in the specific fuel consumption (SFC) with an increase in the advance angle. In contrast, the plots 286 and 288 illustrate an increase in the peak firing pressure (PFP) with an increase in the advance angle. As a result, the specific fuel consumption (SCF) and the peak firing pressure (PFP) are inversely proportional relative to one another. At the first speed of the engine, the specific fuel consumption (SFC) is relatively high and the peak firing pressure (PFP) is relatively low as illustrated by plots 282 and 286. However, as mentioned above, an increase in the advance angle causes both an improvement in the specific fuel consumption (SFC) and also an increase in the peak firing pressure (PFP) as illustrated by plots 282 and 286. Unfortunately, the peak firing pressure (PFP) of plot 286 eventually reaches the peak firing pressure (PFP) limit 290.

Accordingly, the previously described multi-fuel control systems and methods may be employed to reduce the engine speed from the first speed to the second speed as represented by plots 284 and 288. As a result of the reduced engine speed, the peak firing pressure (PFP) shifts upward from the plot 286 to the plot 288. However, the graph 280 illustrates that an advance angle 292 may be selected by the control system to provide a reduced specific fuel consumption (SFC) and a peak firing pressure (PFP) close to but below the limit 290, as indicted by an intersection 294 of the plots 284 and 288.

FIG. 9 illustrates a variety of adjustments that can be taken to maintain the peak firing pressure (PFP) below the limit 290, while also minimizing the specific fuel consumption (SFC). Again, the previously described multi-fuel control systems and methods may increase the engine speed from the second speed to the first speed, retard the fuel injection timing (i.e., reduce the advance angle), or a combination thereof. Conversely, if the peak firing pressure is below the limit 290, then the previously described multi-fuel control systems and methods may advance the fuel injection timing (i.e., increase the advance angle), or reduce the engine speed from the first speed to the second speed, or a combination thereof. Although graph 280 illustrates exemplary techniques to reduce the specific fuel consumption (SFC) and maintain the peak firing pressure (PFP) below the limit 290, other embodiments of the multi-fuel control system and method may adjust other parameters of the system of FIG. 1 to optimize the engine for the particular fuel.

Technical effects of the disclosed embodiments of the invention include the operability a combustion-engine system (e.g., system) with a plurality of different fuels in a controlled manner that reduces exhaust emissions, reduces specific fuel consumption (SFC), and maintains components/parameters within design limits. In other words, the technical effects of the disclosed embodiments of the invention include an engine that is fuel independent, i.e., not limited to one specific fuel. As discussed above, the technical effect of a fuel independent engine may be achieved by making various controls dependent on the fuel characteristics, thereby adjusting operation of the engine to account for the different fuel characteristics to reduce exhaust emissions, reduce specific fuel consumption (SFC), and maintain components/parameters within design limits. The technical effects may be carried out by a computer-implemented method or system, such as illustrated in FIGS. 1-4 and described in detail above. For example, each step, decision block, or the like, as shown in FIGS. 2-4 may correspond to a computer instruction, logic, or software code disposed on a computer readable or machine readable medium. By further example, the computer-implemented methods and/or code may be programmed into an electronic control unit (ECU) of an engine, a main control system of a vehicle (e.g., a locomotive unit), a remote control station that communicates with the vehicle, or the like. In certain embodiments, the computer-implemented method or system may be programmed into the multi-fuel control of the engine controller (e.g., electronic control unit) shown in FIG. 1.

For example, in certain embodiments as described above, a system may include a computer readable medium (e.g., control 50 of FIG. 1) and code (e.g., processes 100, 120, or 140 of FIGS. 2-4) disposed on the computer readable medium, wherein the code comprises instructions to adjust one or more parameters affecting operation of an engine to account for different fuel characteristics of a plurality of different fuels. The code may include instructions to control a specific fuel consumption, and instructions to control at least one of a peak firing pressure, a pre-turbine temperature, a turbospeed, or a maximum fuel injection pressure. The system also may include at least one of an engine control unit having the computer readable medium, an engine having the computer readable medium, or an engine powered vehicle having the computer readable medium.

An embodiment relates to a system. The system comprises a controller operable to communicate with at least one sensor and with an engine, and thereby to control operation of the engine, wherein the engine is operable with a first fuel and a second fuel, the first fuel and the second fuel not being the same type of fuel. The controller is configured to change or maintain the engine operation based on information regarding the first fuel and the second fuel, and further based on one or more signals received from the at least one sensor compared to the determined engine operation threshold limits, and the controller is configured to change or maintain an engine fuel supply to control specific fuel consumption of at least one of the first fuel or the second fuel and to achieve values for the one or more signals in a determined range relative to the engine operation threshold limits. The one or more signals indicate at least one of an exhaust emissions parameter or one or more of a pre-turbine temperature, a fuel injection pressure, a turbocharger rotational speed, a peak firing pressure, a rate of pressure rise, or a knock intensity.

The controller is operable to change a fuel flow rate to the engine of the first fuel relative to the second fuel, and thereby to change a fuel ratio of the first fuel relative to the second fuel. The exhaust emissions parameter is based on at least one exhaust component comprising nitrogen oxide, particulate matter, hydrocarbon, or carbon monoxide.

The engine operation threshold limits may include a pre-turbine temperature threshold limit, a fuel injection pressure threshold limit, a turbocharger rotational speed threshold limit, a peak firing pressure threshold limit, and/or a rate of pressure rise threshold limit.

The controller is operable to derate the engine, decrease engine speed, or decrease a manifold air pressure in response to a sensed measurement that a turbocharger rotational speed is greater than the turbocharger rotational speed limit. The controller is operable to at least one of advance fuel injection timing or decrease engine speed if a peak firing pressure is not greater than the peak firing pressure limit. The controller is operable to at least one of retard fuel injection timing or increase engine speed if the peak firing pressure is greater than the peak firing pressure limit.

The knock intensity may be inferred by a pressure trace or measured by a knock sensor. The first fuel may comprise diesel fuel and the second fuel may comprise natural gas.

The controller is operable to control for the first fuel, the second fuel, or for both the first and second fuels supplied to the engine at least one of: fuel injection timing, fuel supply pressure, fuel supply temperature, fuel supply rate, or a ratio of the first fuel to the second fuel.

The controller is operable to control at least one of manifold air pressure or engine speed in response to the one or more signals received from the at least one sensor during combustion of the at least one of the first or the second fuel.

The controller is operable to vary one or more of fuel injection timing, fuel supply pressure, fuel supply temperature, fuel ratio, manifold air pressure, engine speed, or EGR rate.

The controller is operable to change or maintain the engine operation as the one or more signals are compared to the engine operation threshold limits, and the controller is configured to change or maintain the engine fuel supply to achieve values for the one or more signals received from the at least one sensor in a determined range relative to the engine operation threshold limits and to reduce specific fuel consumption of one or more different fuels of the at least first fuel and second fuel.

The controller is operable to supply simultaneously to the engine two or more of a plurality of fuels so that the engine operation is maintained below a peak firing pressure limit and a turbocharger rotational speed limit, and engine operation further is based on one or more of the rate of pressure rise, the knock intensity, the pre-turbine temperature, or a maximum fuel injection pressure to be within determined, corresponding engine operational threshold limits, and thereby to reduce the total specific fuel consumption. The two or more of the plurality of fuels may include the first fuel, the second fuel, and/or other fuels.

Another embodiment of a system includes a controller operable to communicate with at least one sensor and with an engine, and thereby to control operation of the engine, wherein the engine is operable with a first fuel and a second fuel, the first fuel and the second fuel not being the same type of fuel. The controller is configured to change or maintain the engine operation based on information regarding the first fuel and the second fuel, and further based on one or more signals received from the at least one sensor compared to determined engine operation threshold limits, and the controller is configured to change or maintain an engine fuel supply to control specific fuel consumption of at least one of the first fuel or the second fuel and to achieve values for the one or more signals in a determined range relative to the engine operation threshold limits, where the one or more signals indicate knock intensity.

The controller is operable to vary one or more of fuel injection timing, fuel supply pressure, fuel supply temperature, fuel ratio, manifold air pressure, engine speed, or EGR rate.

The controller is operable to control for the first fuel, the second fuel, or for both the first and second fuels supplied to the engine at least one of: fuel injection timing, fuel supply pressure, fuel supply temperature, fuel supply rate, or a ratio of the first fuel to the second fuel.

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

While only certain features of the invention have been illustrated and described herein, many modifications and changes will occur to one of ordinary skill in the art. It is, therefore, to be understood that the appended claims are intended to cover all such modifications and changes as fall within the scope of the claimed invention.

What is claimed is:

1. A system, comprising:
a controller operable to communicate with at least one sensor and with an engine, and thereby to control operation of the engine, wherein the engine is operable with a first fuel and a second fuel, the first fuel and the second fuel not being the same type of fuel;
wherein the controller is configured to change or maintain the engine operation based on information regarding the first fuel and the second fuel, and further based on one or more signals received from the at least one sensor compared to determined engine operation threshold limits, and the controller is configured to change or maintain an engine fuel supply to control specific fuel consumption of at least one of the first fuel or the second fuel and to achieve values for the one or more signals in a determined range relative to the engine operation threshold limits,
wherein the one or more signals indicate at least one of an exhaust emissions parameter or one or more of: a pre-turbine temperature, a fuel injection pressure, a turbocharger rotational speed, a peak firing pressure, a rate of pressure rise, or a knock intensity.

2. The system of claim 1, wherein the controller is operable to change a fuel flow rate to the engine of the first fuel relative to the second fuel, and thereby to change a fuel ratio of the first fuel relative to the second fuel.

3. The system of claim 1, wherein the exhaust emissions parameter is based on at least one exhaust component comprising nitrogen oxide, particulate matter, hydrocarbon, or carbon monoxide.

4. The system of claim 1, wherein the engine operation threshold limits include a pre-turbine temperature threshold limit.

5. The system of claim 1, wherein the engine operation threshold limits include a fuel injection pressure threshold limit.

6. The system of claim 1, wherein the engine operation threshold limits include a turbocharger rotational speed threshold limit.

7. The system of claim 6, wherein the controller is operable to derate the engine, decrease engine speed, or decrease a manifold air pressure in response to a sensed measurement that a turbocharger rotational speed is greater than the turbocharger rotational speed limit.

8. The system of claim 1, wherein the engine operation threshold limits include a peak firing pressure threshold limit.

9. The system of claim 8, wherein the controller is operable to at least one of advance fuel injection timing or decrease engine speed if a peak firing pressure is not greater than the peak firing pressure limit.

10. The system of claim 8, wherein the controller is operable to at least one of retard fuel injection timing or increase engine speed if the peak firing pressure is greater than the peak firing pressure limit.

11. The system of claim 1, wherein the engine operation threshold limits include a rate of pressure rise threshold limit.

12. The system of claim 1, wherein the knock intensity is inferred by a pressure trace or measured by a knock sensor.

13. The system of claim 1, wherein the first fuel comprises diesel fuel and the second fuel comprises natural gas.

14. The system of claim 1, wherein the controller is operable to control for the first fuel, the second fuel, or for both the first and second fuels supplied to the engine at least one of: fuel injection timing, fuel supply pressure, fuel supply temperature, fuel supply rate, or a ratio of the first fuel to the second fuel.

15. The system of claim 1, wherein the controller is operable to control at least one of manifold air pressure or engine speed in response to the one or more signals received from the at least one sensor during combustion of at least one of the first fuel or the second fuel.

16. The system of claim 1, wherein the controller is operable to vary one or more of fuel injection timing, fuel supply pressure, fuel supply temperature, fuel ratio, manifold air pressure, engine speed, or EGR rate.

17. The system of claim 1, wherein the controller is operable to change or maintain the engine operation as the one or more signals are compared to the engine operation threshold limits, and the controller is configured to change or maintain the engine fuel supply to achieve values for the one or more signals received from the at least one sensor in a determined range relative to the engine operation threshold limits and to reduce specific fuel consumption of one or more different fuels of the at least first fuel and second fuel.

18. The system of claim 1, wherein the controller is operable to supply simultaneously to the engine two or more of a plurality of fuels, the plurality of fuels including the first fuel and the second fuel, so that the engine operation is maintained below a peak firing pressure limit and a turbocharger rotational speed limit, and engine operation further is based on one or more of the rate of pressure rise, the knock intensity, the pre-turbine temperature, or a maximum fuel injection pressure to be within determined, corresponding engine operational threshold limits, and thereby to reduce the total specific fuel consumption.

19. The system of claim 1, wherein the one or more signals indicate the knock intensity.

20. The system of claim 19, wherein the controller is operable to vary one or more of fuel injection timing, fuel supply pressure, fuel supply temperature, fuel ratio, manifold air pressure, engine speed, or EGR rate.

21. The system of claim 19, wherein the controller is operable to control for the first fuel, the second fuel, or for both the first and second fuels supplied to the engine at least one of: fuel injection timing, fuel supply pressure, fuel supply temperature, fuel supply rate, or a ratio of the first fuel to the second fuel.

22. A system, comprising:
an engine operable with a first fuel and a second fuel, the first fuel and the second fuel not being the same type of fuel;
at least one sensor;
a controller operable to communicate with the at least one sensor and to control the engine;
wherein the controller is configured to change or maintain operation of the engine based on information regarding the first fuel and the second fuel, and further based on one or more signals received from the at least one sensor compared to determined engine operation threshold limits, and the controller is configured to change or maintain an engine fuel supply to control specific fuel consumption of at least one of the first fuel or the second fuel and to achieve values for the one or more signals in a determined range relative to the engine operation threshold limits,
wherein the one or more signals indicate at least one of an exhaust emissions parameter or one or more of: a pre-turbine temperature, a fuel injection pressure, a turbocharger rotational speed, a peak firing pressure, a rate of pressure rise, or a knock intensity.

23. A vehicle comprising the system of claim 22, wherein the engine is a diesel engine.

* * * * *